United States Patent
Eriksen et al.

(10) Patent No.: US 7,021,348 B2
(45) Date of Patent: Apr. 4, 2006

(54) DEVICE FOR SEALING AND INFLATING AN INFLATABLE OBJECT

(75) Inventors: Steen Mandsfelt Eriksen, Græsted (DK); Thomas Lætgaard, Horsens (DK); Peter Egelund, Solbjerg (DK); Stig Gamborg, Rønde (DK)

(73) Assignee: Even Honour International Limited (VG)

( * ) Notice: Subject to any disclaimer, the term of this patent is extended or adjusted under 35 U.S.C. 154(b) by 93 days.

(21) Appl. No.: 10/844,546

(22) Filed: May 13, 2004

(65) Prior Publication Data

US 2005/0056358 A1 Mar. 17, 2005

Related U.S. Application Data

(63) Continuation of application No. PCT/DK02/00763.

(30) Foreign Application Priority Data

Nov. 15, 2001 (DK) .......................... 2001 01700
Dec. 18, 2001 (DK) .......................... 2001 01908

(51) Int. Cl.
    *B60C 17/00* (2006.01)

(52) U.S. Cl. .................... 152/415; 152/416; 141/38; 222/389

(58) Field of Classification Search ............. 152/415, 152/416, 417, 419, 427, 428, 429, 430, 431, 152/502, 504; 406/146; 156/115; 141/38, 141/67, 9, 102; 222/389, 399
See application file for complete search history.

(56) References Cited

U.S. PATENT DOCUMENTS 3,355,112 A * 11/1967 Shaffer et al. ............. 239/666
4,097,241 A * 6/1978 Garner et al. ............. 102/335
5,909,752 A    6/1999 Gerresheim et al. ....... 141/38
6,176,285 B1   1/2001 Gerresheim et al. ....... 152/509
6,736,170 B1 * 5/2004 Eriksen et al. ........... 141/38
2004/0000365 A1 1/2004 Eckhardt ................ 152/509

FOREIGN PATENT DOCUMENTS

| DE | 297 16 453 U1 | 3/1999 |
| DE | 229716453 U1 * | 3/1999 |
| DE | 299 13 545 U1 | 2/2000 |
| DE | 100 15 166 | 10/2001 |
| EP | 0 832 764 A2 | 4/1998 |
| JP | 2000238144 | 9/2000 |
| JP | 2001212883 | 9/2000 |

* cited by examiner

*Primary Examiner*—Frantz F. Jules
(74) *Attorney, Agent, or Firm*—Winston & Strawn LLP (57) ABSTRACT

A device for inflating a tire having gone flat to a wanted pressure and for sealing and inflating a puncture tire. The device includes a compressed-air source, a tubular container filled with a sealing agent, and a first conduit having an adapter at its second end for connecting the conduit to a valve on the tire. The container furthermore has an inlet opening for passage of compressed air from the compressed-air source and an outlet opening for passage of sealing agent. The container is enclosed by a tubular cylinder having at one end an aperture closed by a cover. The cover is mounted displaceable on the cylinder between a first operative position and a second operative position. Thereby, it is obtained that the device is quick and easy to operate. Sealing and inflating of a puncture tire are done in between one and three minutes. Packed up, the device takes up practically no space whereby the heavy and bulky spare wheel is made unnecessary. Thereby, the space and load capacity previously occupied by the spare wheel is utilized.

14 Claims, 12 Drawing Sheets

DEVICE FOR SEALING AND INFLATING AN INFLATABLE OBJECT

CROSS-REFERENCE TO RELATED APPLICATIONS

This application is a continuation of International application PCT/DK02/00763 filed Nov. 14, 2002, the entire content of which is expressly incorporated herein by reference thereto.

BACKGROUND ART

The invention relates to a device for inflating a tire that has gone flat to inflate the tire to a desired pressure and for sealing and inflating a punctured tire. These type devices comprise a compressed-air source; a tubular container filled with a sealing agent and having an inlet opening for passage of compressed air from the compressed-air source and an outlet opening for passage of sealing agent; a first conduit connected to a first area on the device at a first end and having an adapter at the second end for detachably connecting the first conduit to a valve on the tire; and a second conduit connected to a second area on the device at a first end and to the compressed-air source at the second end.

Tires on vehicles such as cars, motorcycles and ordinary bicycles are in danger of puncturing if the vehicle runs over sharp objects on the road, especially during driving. If a tire on a bicycle punctures, an unpleasant situation might arise that the cyclist cannot or only can continue with difficulty because it is not possible to mend the punctured tire on the spot.

To avoid getting in the same serious situation, cars are therefore usually provided with a spare wheel for replacing a punctured tire. However, many drivers are not able to make such a change of wheel themselves and others find the job difficult and unpleasant. The spare wheel also poses a considerable problem in itself as the spare wheel reduces the net load of the car and occupies otherwise usable space.

With a view to eliminate the above problems, devices have therefore been developed over the years for being able to mend a punctured tire on the spot in an easy and manageable manner. The main components of these devices are a compressed-air source and a container containing a sealing agent.

Such an integrated device is known from DE 2297 16 453 U1 which has a flexible container located in a pressure chamber which can be pressurized by a compressor upon use. The device has a first breaking point above the container and a second breaking point in a direct connection between the compressor and the tire, which is to be sealed and inflated.

A disadvantage of the described known device and technique is that its application is limited to the ability of the two breaking points to resist a certain load. The known device is therefore not universally applicable. Accordingly, improvements are desired for such devices and methods, and these are now provided by the present invention.

SUMMARY OF THE INVENTION

One aspect according to the invention is to provide a device for inflating a tire that has gone flat, which device can be used quickly and easily to inflate a tire to a desired pressure and that furthermore is able to quickly and easily seal and inflate a punctured tire as well.

Another aspect of the invention is to provide a tire inflation device which has a simple and inexpensive structure. Also, such a device preferably has a compact design and a very small volume.

These aspects are achieved in a tire inflation device which comprises a compressed-air source; a tubular container that contains a sealing agent and has an inlet opening for passage of compressed air from the compressed-air source and an outlet opening for passage of sealing agent and compressed air into the tire. The device also includes a first conduit connected to a first area on the device at a first end and an adapter for detachably connecting the first conduit to a valve on the tire at the second end. A second conduit is connected to a second area on the device at the first end and to the compressed-air source at the second end. The container is advantageously enclosed by a tubular cylinder connected to the first end of the second conduit and having a fixed bottom in one end and an aperture in the other end. The aperture can be closed by a cover connected to the first end of the first conduit and mounted on the cylinder displaceable between a first operative position in which the first conduit is communicating with the interior of the cylinder and a second operative position in which the first conduit is communicating with the outlet opening of the container.

The invention also relates to a method of inflating a flat tire, which comprises filling the tire with compressed air from the device disclosed herein to inflate the tire to a desired pressure. Also, the invention relates to a method of inflating a punctured tire, which comprises filling the tire with compressed air and sealing agent from the device disclosed herein so that the sealing agent seals the puncture and the compressed air inflates the tire to a desired pressure.

BRIEF DESCRIPTION OF THE DRAWINGS

The invention will be explained in greater details below, describing only exemplary embodiments and giving further advantageous characteristics and technical effects of the device according to the invention with reference to the drawing, in which.

DETAILED DESCRIPTION OF THE PREFERRED EMBODIMENTS

Normally, the device is lying ready for use in e.g. the boot of a car with the cover located in its first operative position and the sealing agent sealed in the container. In this state, the device can readily be used for quickly and easily inflating a tire having gone flat to a wanted pressure, which possibly can be indicated, on a manometer fitted on the device. The adapter of the first conduit merely has to be connected to the valve of the tire and the pressure source which typically can be a compressor driven by an electric motor.

If the electric motor is connected to a power source, for example, a cigarette lighter in a car, the compressor will generate compressed air which, via the first conduit, will flow into the tire which thereby is inflated. When the wanted pressure has been reached, the power is cut from the motor and the adapter of the first conduit removed from the valve of the tire. The device is now ready to be used again as pump and the sealing agent in the container is still intact.

If the device is to be used for sealing and inflating a punctured tire, the adapter of the first conduit is also connected to the valve of the tire, whereas the cover is displaced to its second operative position whereby the first conduit is made to communicate with the outlet opening of the container. When the compressed-air source then is activated, the compressed air will force the sealing agent into the tire via the first conduit and after the container has been emptied of sealing agent, the compressed air will continue to flow into the tire via the first conduit.

As it can be seen, a punctured tire on a car is sealed and inflated in this way quickly, effectively and easily so that the car can be relieved of the load of having to drive around with a spare wheel whereby expenses to gas are saved in the long run. At the same time, the driver is freed from the difficult, unpleasant job of having to change a tire if occasion should arise. By means of a device according to the invention a punctured tire can be mended in less than a minute that is in far shorter time than it takes to change a punctured tire for a spare wheel.

In a preferred embodiment of the device according to the invention, the outlet opening of the container is sealed by means of a first seal. Behind the sealing agent in the container, a plunger is located displaceable from a bottom position at the inlet opening to a top position at the outlet opening, and an aperture, sealed by means of a second seal, is made in the plunger. Furthermore, the cover is provided with a needle connected to the first end of the first conduit.

In one embodiment, the first or second seal or both can be a breakable membrane made in one piece with the edge of the respective aperture. This embodiment is especially expedient if the container and the plunger are cast of for example plastic as the seal then is formed automatically during the casting process itself.

In a second embodiment, the first or second seal or both can be designed as a slab detachably mounted in the respective aperture. In this solution the slabs are mounted in the respective apertures with a suitable force fit. During use, the slab or slabs are then pushed out of the associate aperture easily and for certain by means of the needle which does not have to be provided with a cutting edge for this purpose but best can be blunt.

In the first operative position of the cover, the needle is located at a distance from the first seal. In this state, the device can immediately be used for inflating a tire having gone flat to a wanted pressure. The sealing agent is kept securely sealed in the container during this by means of the first seal over its outlet opening.

But if the cover is displaced from its first to its second operative position, the needle will penetrate the first seal whereby the interior of the latex-filled container is connected to the needle. When the compressed-air source then is activated, compressed air is generated which will displace the plunger in direction towards its top position whereby the plunger will press the sealing agent in the container into the tire via the first conduit.

In the top position of the container, the needle will also penetrate the second seal which is sealing the aperture of the plunger. At this point, the container has been emptied of sealing agent whereby the compressed air is allowed to flow freely into the tire and inflate this tire to a wanted pressure.

In an expedient embodiment, the cylinder and the tire can be interconnected by means of a threaded joint. In this case, the cover is displaced from its first and second operative positions merely by manually rotating the two parts in relation to each other. For example, the cylinder can be the rotatable part whereas the cover is fixed.

The outlet opening of the container can advantageously be arranged in a branch piece on a bottom designed on the container, and both this branch piece and the needle can furthermore be designed with barbs engaging each other when the device is in its second operative position.

If the needle furthermore is detachably mounted in an aperture made in the cover and sufficiently large to allow the first conduit and its adapter to pass, the empty container, needle and conduit with its adapter can be pulled completely free of the cover and thereby the device, the needle and the branch piece of the container being hooked together by means of their barbs. After sealing and inflation of a punctured tire, these parts will be useless as they are now clogged by hardened sealing agent and therefore must be replaced.

An expedient piping is obtained if the first end of the second conduit is connected to the cover, and a gap is located between the container and the cylinder, through which gap the second conduit can communicate with the inlet opening of the container.

During a sealing and inflating operation, the operator can advantageously follow the process if the cylinder and the container are made of a transparent material whereas the plunger and/or sealing agent have a distinct, dark color, as the operator then can see how the container is successively emptied of sealing agent.

For practical reasons, the different components of the device can be collected in a box. If the box is designed with a window or opening, the operator will be able to follow the process even if the cylinder and the container are still in the box.

Via the same window or a different window, the operator is also made able to displace the cover from one operative position to the other. If the cylinder and cover are interconnected by means of a threaded joint, said displacement takes place merely by manually rotating e.g. the cylinder in relation to the cover.

In the following it is assumed that the device 1 according to the invention is to be used for inflating a car tire 2 having gone flat or alternatively for sealing and inflating a punctured tire 3 and that the sealing agent is latex 7.

The drawing figures show a device 1 according to the invention that comprises a compressor 4 driven by a motor 5 during operation, and a tubular container 6 filled with latex 7 and having and inlet opening 8 for passage of compressed air from the compressor 4 and an outlet opening 9 for passage of latex 7 or air.

A first conduit 10 is connected to the device 1 at a first end 11 whereas the second end 12 is provided with an adapter 13 for detachably connecting the first conduit 10 to a valve 14 on the cover 2.

Furthermore, the device 1 is connected to a first end 15 of the second conduit 16 which is connected to the compressor 4 at its second end 17.

The container 6 is enclosed by a tubular cylinder 18 having a fixed bottom 19 at one end and an aperture 20 at the other end, said aperture being closed by a cover 22 by means of a threaded joint 21, the cover being connected to both the first end 11 of the first conduit 10 and the first end 15 of the second conduit 16.

To be more explicit, the first end 11 of the first conduit 10 is connected to a needle 23 mounted on the cover 22 by means of a number of locking tabs 24. The exterior of the needle 23 is designed with a number of barbs 25.

The container has a second bottom 26 with a branch piece 27 defining the outlet opening 9 of the container, said opening being closed by a first seal 28 in the initial position of the device. The exterior of the branch piece 27 is designed with a number of barbs 29 corresponding to the barbs 25 of the needle.

In the container 6, a plunger 30 is furthermore located that can be displaced from a bottom position 31 at the inlet opening 8 to a top position 32 at the outlet opening 9. In the plunger 30, an aperture 33 is designed and is sealed by a second seal 34.

Figure 1:
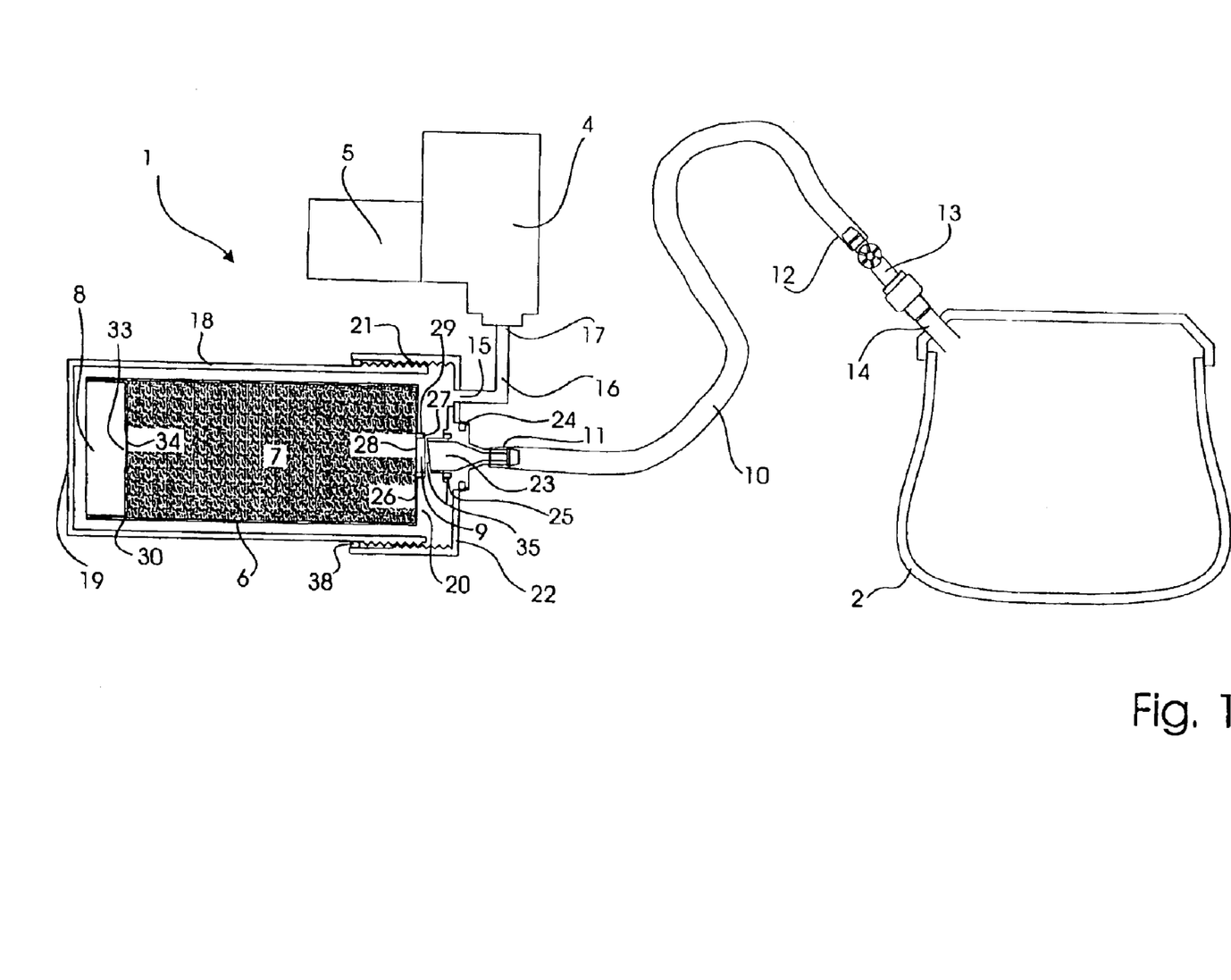
FIG. 1 is a diagrammatic axial-sectional view of a device in a process step in which a tire having gone flat is inflated to a wanted pressure.

By means of the threaded joint 21, the cover 22 can be turned back and forth between the first operative position in FIG. 1 and the second operative position in FIGS. 2–5.

In the first operative position of the cover, the needle 23 is located, as shown in FIG. 1, at a distance from the first seal 28. In this state, the device can immediately be used for inflating a tire 2 having gone flat to a wanted pressure in the following way.

The adapter 13 of the first conduit 10 is connected to the valve 14 and the motor 5 is connected to e.g. the cigarette lighter in a car (not shown) whereby the compressor 4 is made to generate compressed air which will flow into the tire 22 via the second conduit 16.

As the needle 23 in the first operative position of the cover 22 is located at a distance from the first seal 28, the air flow is allowed to flow via the thus formed gap 35 further out into the needle 23 and from here into the tire 2 via the first conduit 10, the adapter 13 and the valve 14.

The device 1 can possibly be provided with a manometer (not shown) for continuously showing the current pressure in the tire 2 during the inflating operation. When the tire 2 has been inflated to the wanted pressure, the power is cut to the motor 5 and the adapter 13 of the first conduit 10 is removed from the valve 14 after which the device 1 is packed up to be stored for later use in e.g. the boot of the car. As can be seen, the latex 7 in the container 6 is still fully intact and can therefore be used for sealing a punctured tire 3.

When the device 1 is to be used for sealing and inflating a punctured tire 3, the first conduit 10 is connected to the valve 14 of the tire 3 in the same way as described above, and the cover 22 is turned manually to its second position whereby the needle 23 will open the first seal 28 over the outlet opening 7 of the container 6, as shown in FIGS. 2–5, and the barbs 25 of the needle 23 will engage the barbs 29 of the branch piece 27.

Figure 2:
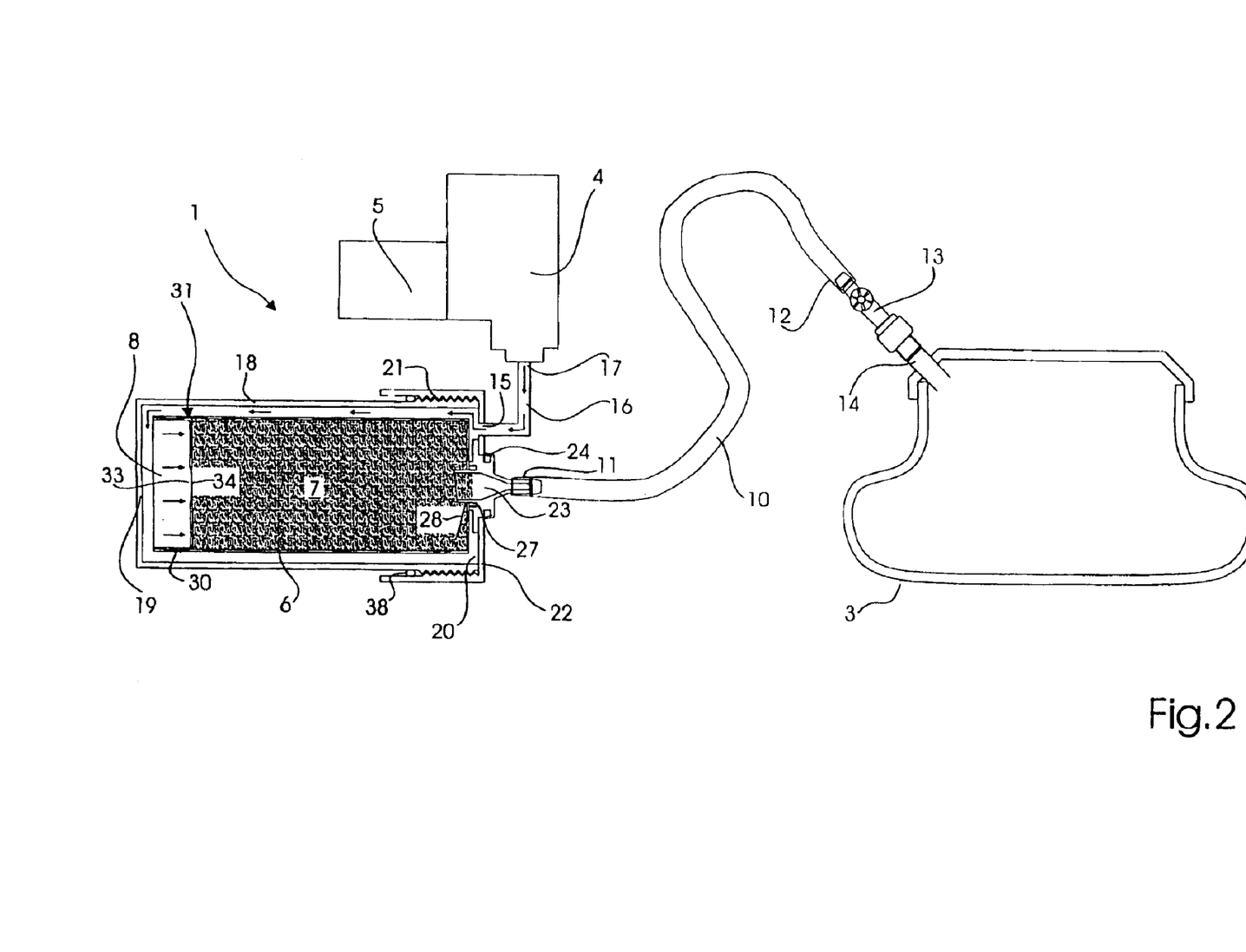
FIG. 2 is the device in FIG. 1 but in a first process step during sealing and inflating of a punctured tire.

Then, the motor 5 and the compressor 4 are activated which thereby will generate compressed air that will flow, as indicated by the arrows, into the cover 22 via the second conduit 16 and from there in under the plunger 30 via a gap 35 located between the cylinder 18 and the container 6. In this phase, the plunger is located in its bottom position 31 near the inlet opening 8 of the container 6, as shown in FIG. 2.

Figure 3:
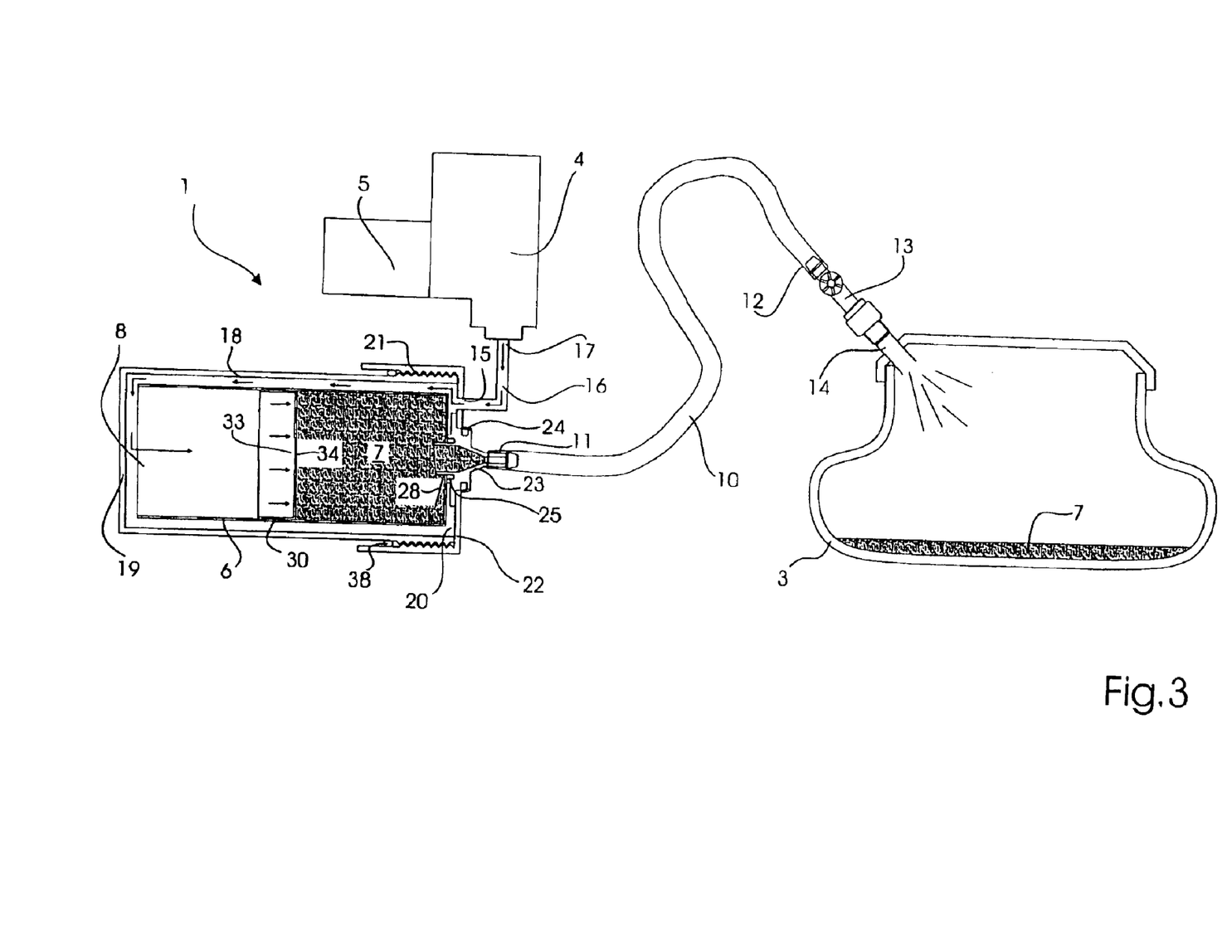
FIG. 3 is the device in FIG. 1 but in a second process step.

As shown in FIG. 3, the plunger 30 will now begin to, under the influence of the generated compressed air, travel in the direction of the arrow towards the needle 23 whereby the plunger 30 will force the latex 7 out into the tire 3 via the needle 23, the first conduit 10, the adapter 13 and the valve 14.

Figure 4:
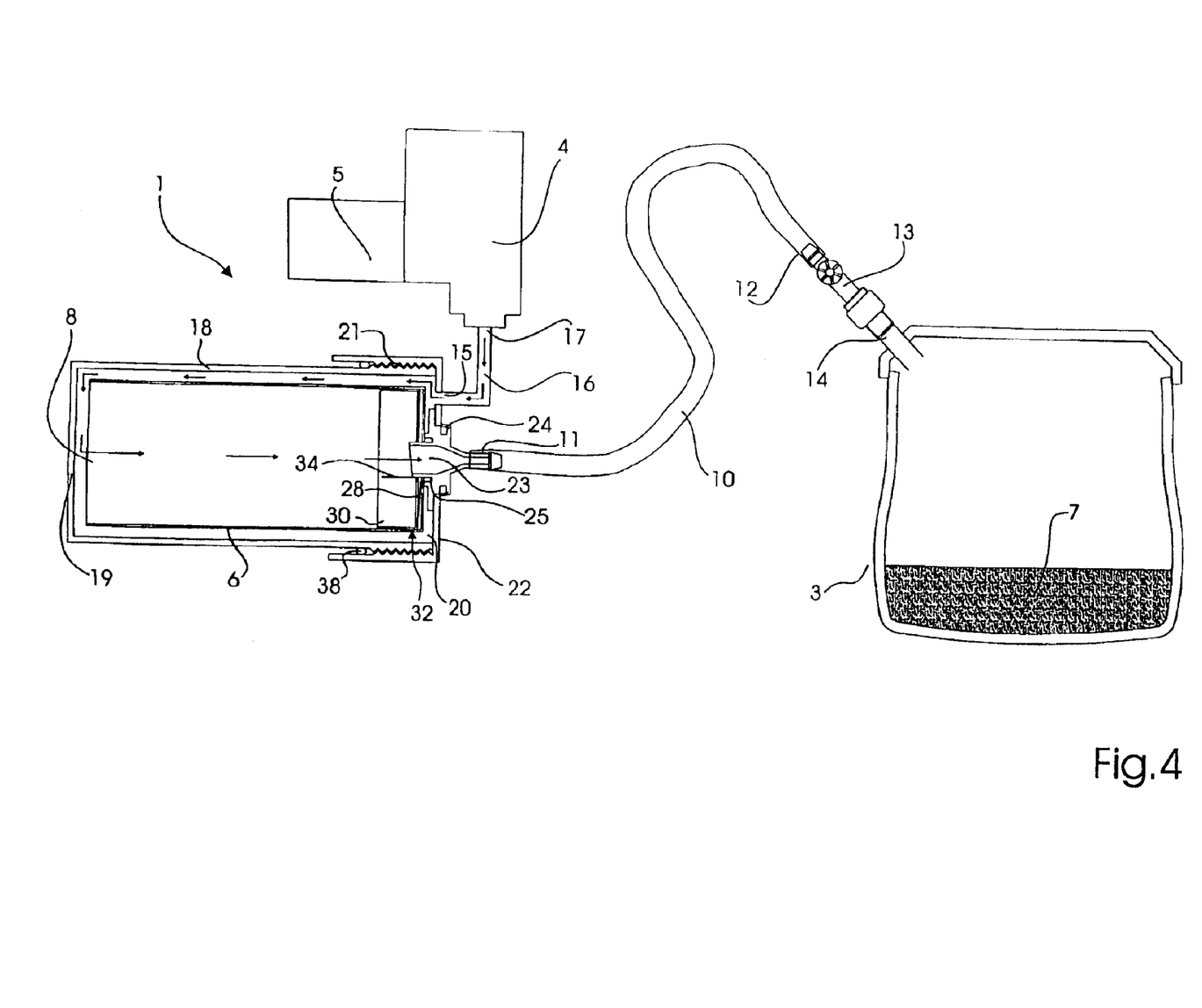
FIG. 4 is the device in FIG. 1 but in a third process step.
Figure 5:
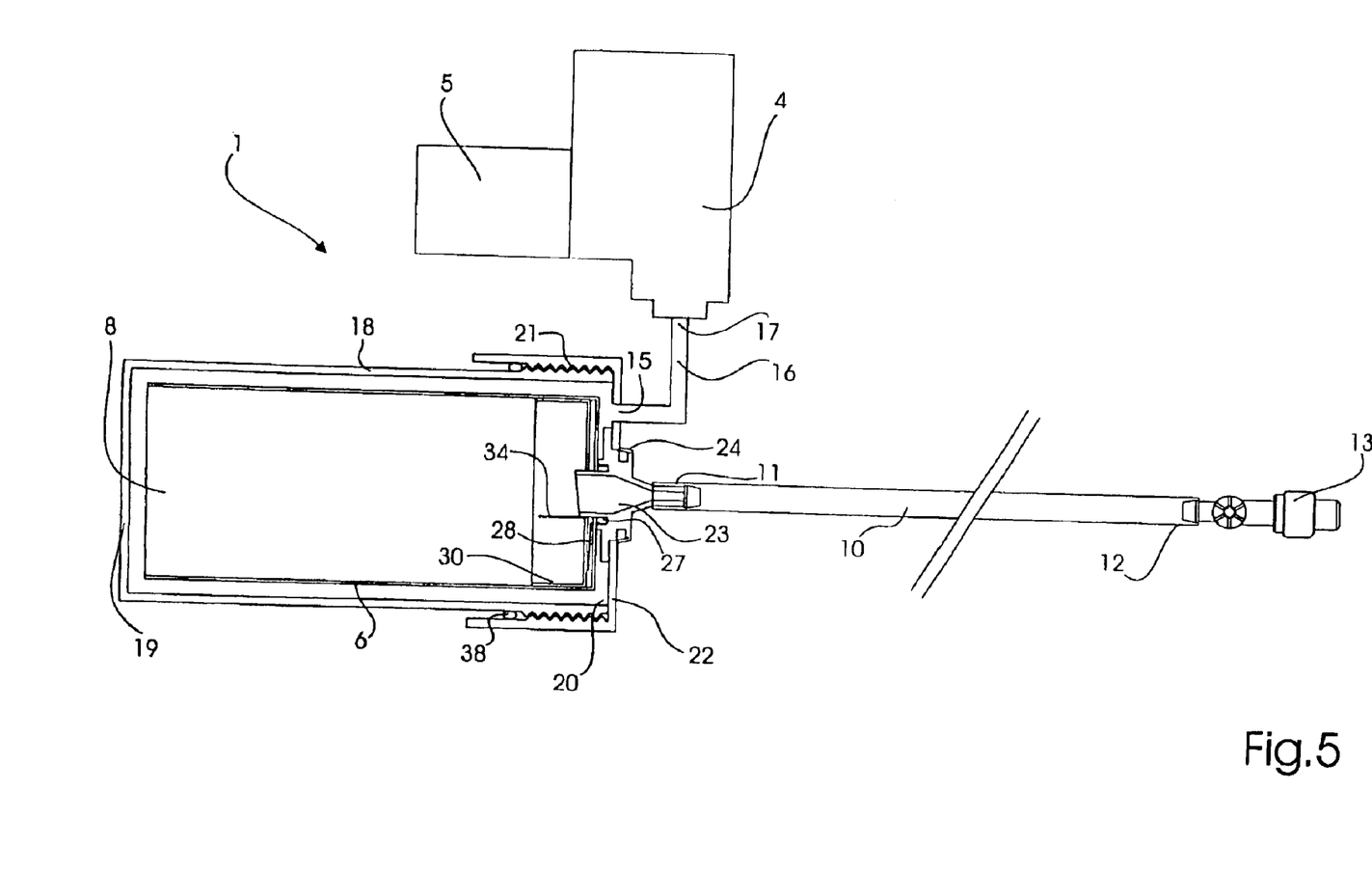
FIG. 5 shows the device after conclusion of the process in FIGS. 2–4.

In FIG. 4, the plunger 30 has reached its top position 32 whereby the second seal 34 over the aperture 33 of the plunger 30 has been opened by the needle 23. The compressed air from the now emptied container 6 will then flow into the tire 3 via the now free passage in the plunger 30, the also free passage of the container 6, the needle 23, the first conduit 10, the adapter 13 and the valve 14 of the tire 3.

During this, the tire 3 is inflated to the wanted pressure and when this pressure has been reached, the adapter 13 is removed from the valve 14 of the tire after which the car is driven a few kilometers to distribute the latex 7 well in the tire 3 and thereby ensure that the latex 7 will reach the puncture.

When the device 1 has been used for sealing and inflating a punctured tire 3, more or less hardened latex 7 will remain in the container 6 and the first conduit 10. Therefore, it will be necessary to replace these components.

Figure 6:
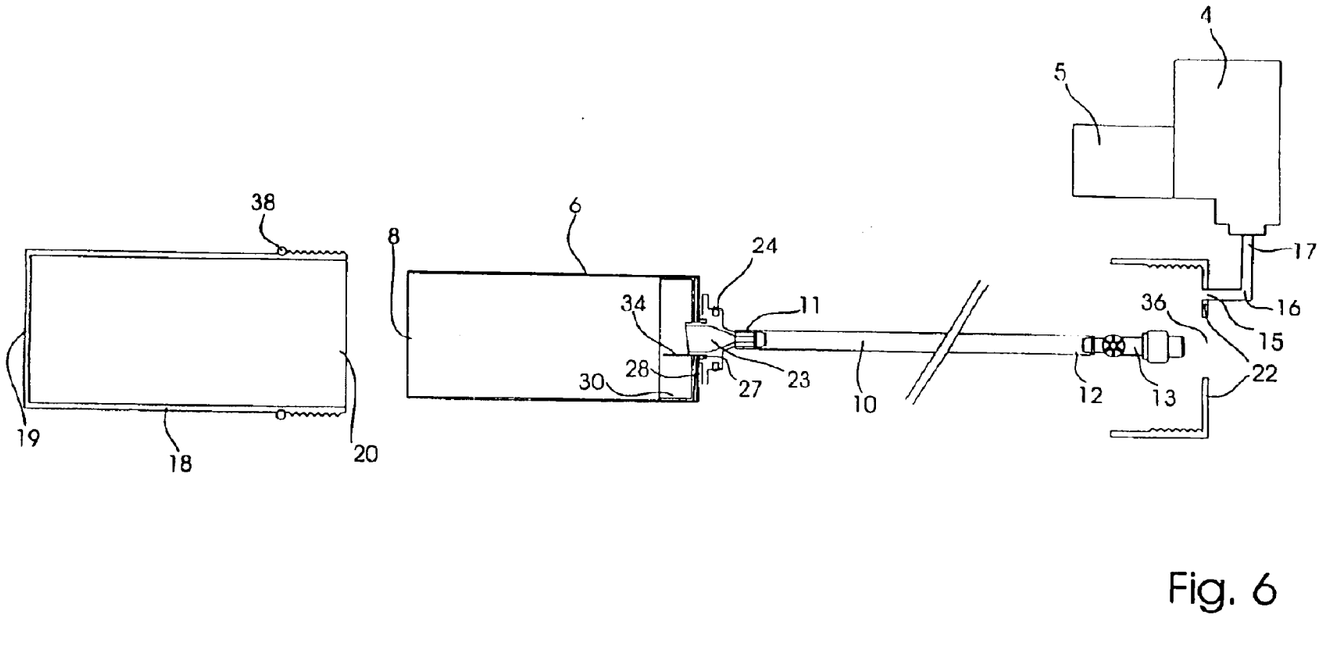
FIG. 6 shows the disassembly of the device for replacement of parts having been clogged by hardened residues of sealing agent.

The container 6 is therefore pulled out of the device 1 as shown in FIG. 6. During this, the first conduit 10 which is connected to the needle 23 will follow as the needle 23 and the branch piece of 27 the container 6 are hooked together by their respective barbs 25; 29, and the first conduit 10 is detachably mounted in the cover 22 in an aperture 36 sufficiently large to allow the adapter to pass.

If the old container 6 with the first conduit 10 is removed, a new, full container with an associate first conduit can be mounted in the device 1.

Figure 7:
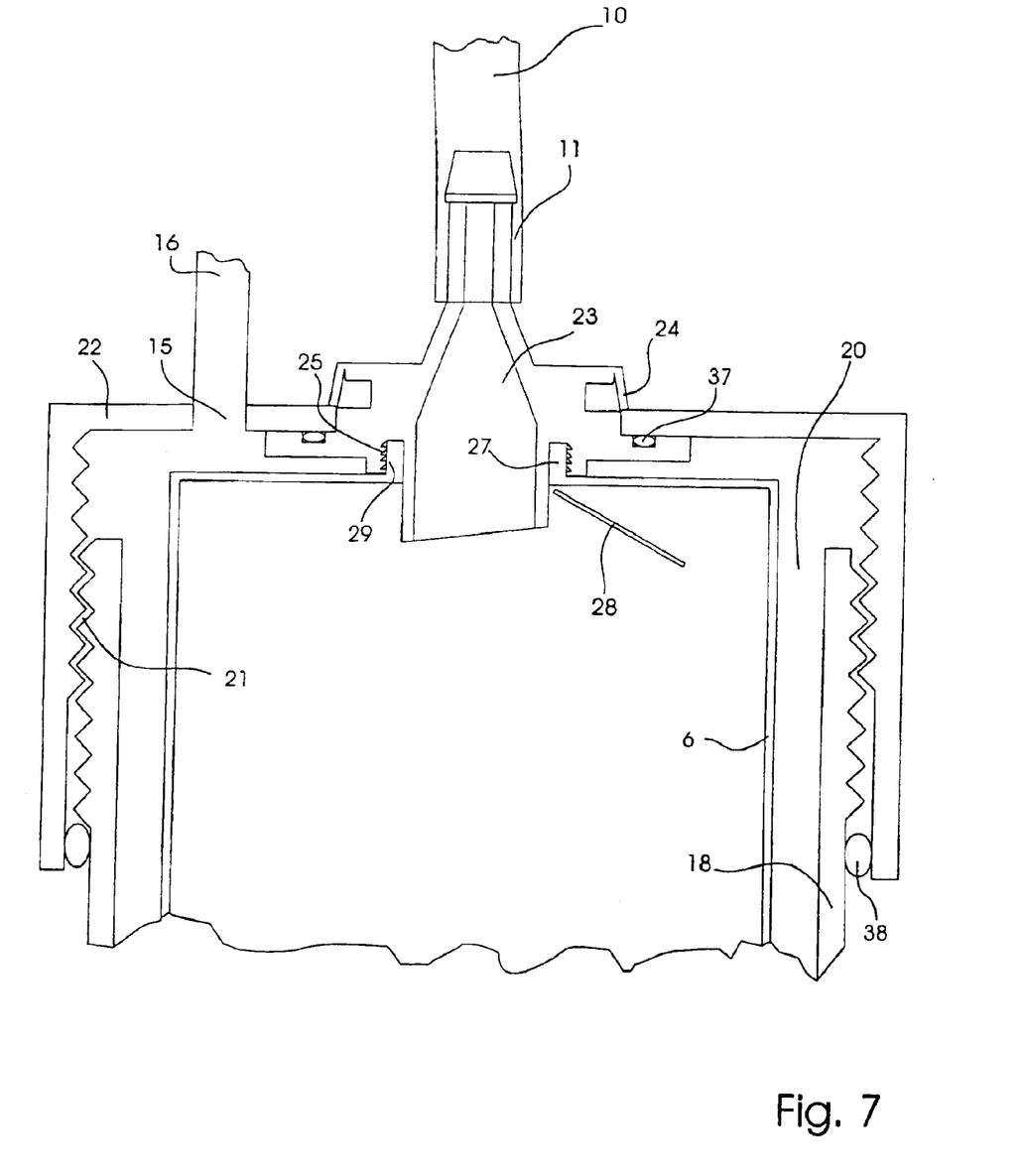
FIG. 7 is on a larger scale a detail of the device.

FIG. 7 is on a larger scale a segment of the device 1 in FIGS. 2–5 with the cover 22 in its second operative position. As shown in the figure, the barbs 29 of the branch piece 27 are hooked to the barbs 25 of the needle 23.

Between the needle 23 and the cover 22, a first gasket 37, for example an O-ring, is provided for ensuring airtight joining between the cover 22 and the needle 23 when the compressor is pumping air into the tire 3.

Between the cover 22 and the cylinder 18, a second gasket 38 is provided for the same reasons.

Figure 8:
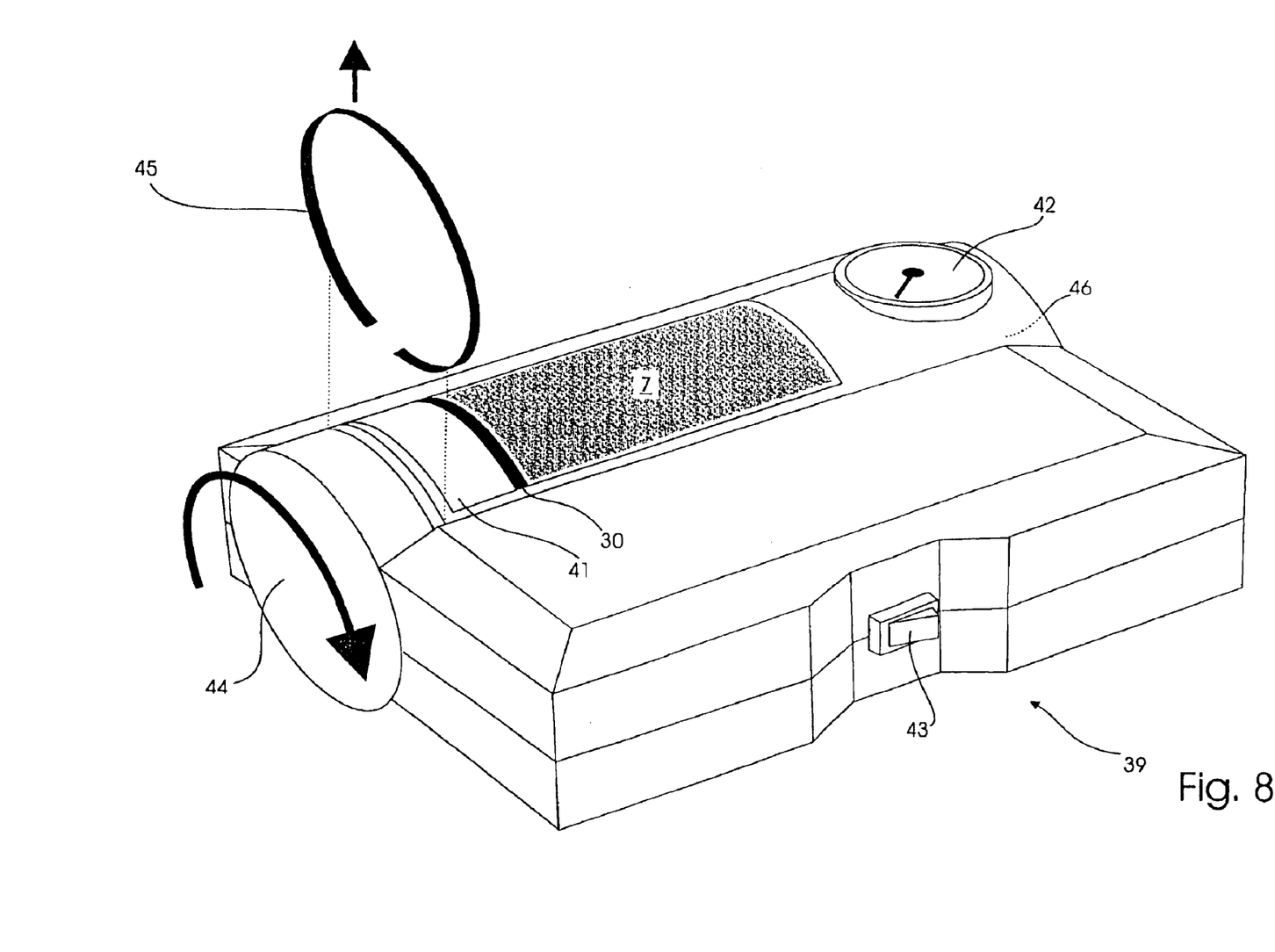
FIG. 8 is a perspective front view of a box in which the device can be placed.
Figure 9:
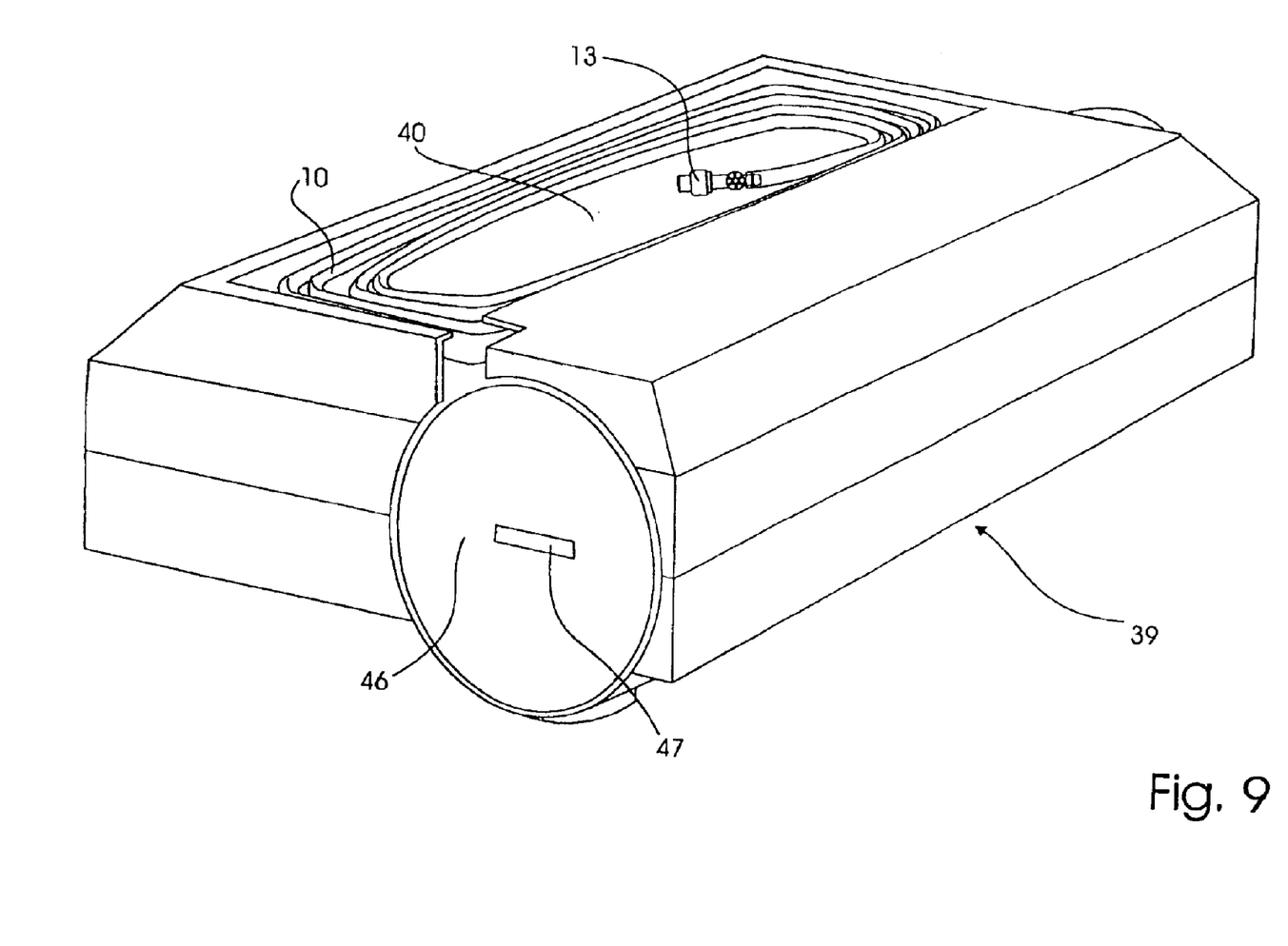
FIG. 9 is a perspective bottom view of the box in FIG. 8.
Figure 10:
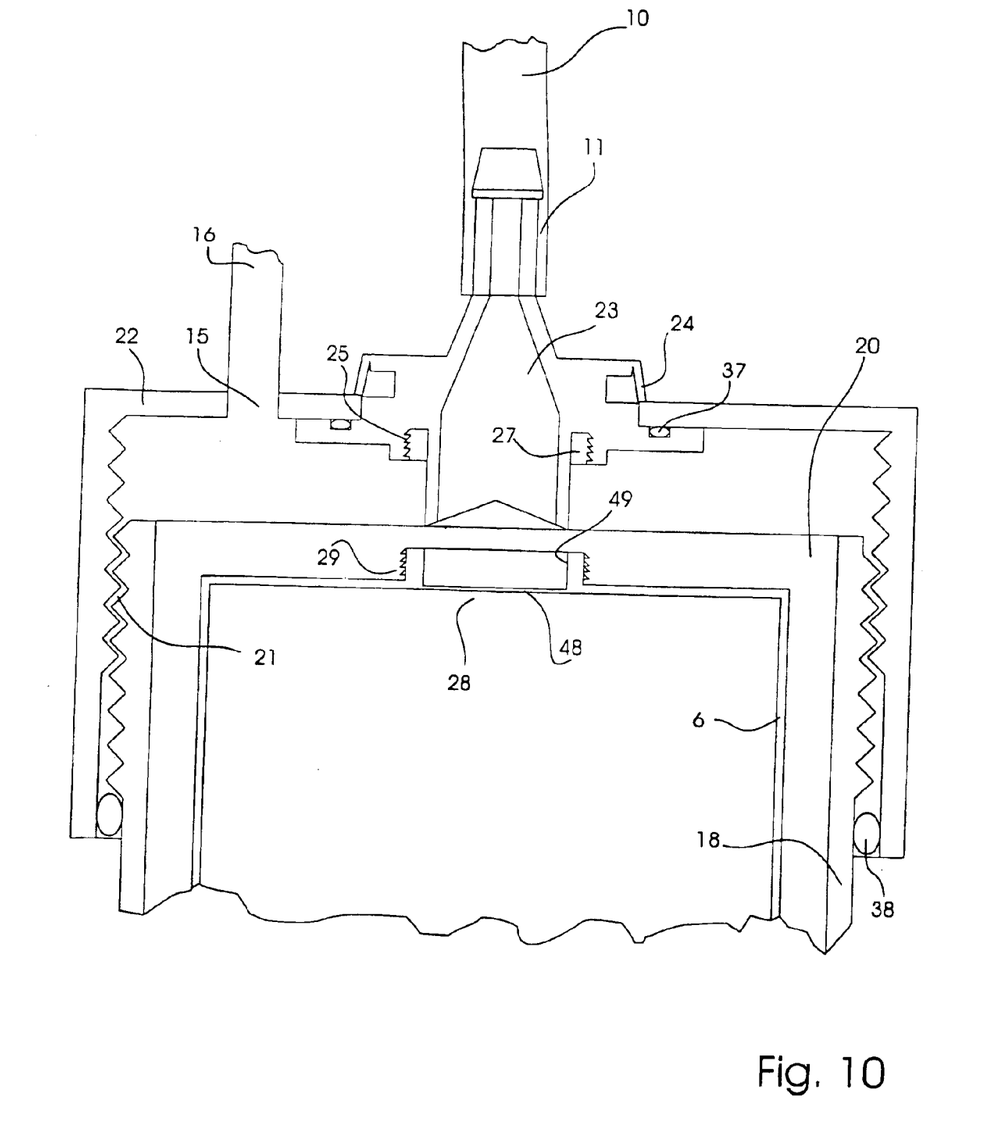
FIG. 10 is on a larger scale a fractional view of the device in FIGS. 1–9 with a first embodiment of a seal in sealed state.

As shown in FIGS. 8 and 9, the device is advantageously assembled as an integrated unit in a cassette or box 39.

As seen best in FIG. 8, the box 39 has a window 41 in form of e.g. an opening allowing continuous inspection of how the compressed air is successively displacing the latex into the tire 3 from an at least partly transparent container 6 located in the box and having a clearly drawn plunger 30. The box 39 furthermore has a manometer 42 connected to the second air conduit 16 for indicating the current air pressure and a breaker 43 for starting the compressor 4 and stopping this compressor when the wanted air pressure has been reached.

The compressor 4 is driven by an electric motor (not shown) connected to a power source e.g. a cigarette lighter in a car at use.

The manometer 42 is advantageously arranged at the window 41 so that the manometer easily can be read during operation. The manometer is also used if e.g. a tire 2 having gone flat is to be inflated. When the wanted pressure has been reached, the compressor 4 is disconnected by the switch 43.

The cylinder 18 is furthermore arranged with a knob 44 serving for pushing the cylinder 7 forward to a position corresponding to the position of the cover 22 in FIGS. 2–5 and the second position described in detail in the previous description by turning the knob in the direction indicated by the arrow in the figure.

To prevent the knob from being turned unintentionally and bring the cylinder 18 and the cover 22 into said second operative position, a safety ring 45 is provided between the knob 44 and the box 39, said ring having to be removed manually in the direction indicated by the arrow in the figure before it will be possible to turn the knob 44.

As seen best in FIG. 9, the box 39 has a section, for example a chamber 40 or an opening, for receiving and keeping the first conduit 10 with associate adapter 13 when the device is not used.

The first conduit 10 is advantageously made of a material, the flexibility/rigidity ratio of which will cause the conduit 10, due to the properties of the material, to arrange itself along the inside edge 40 of the hollow. Alternatively, the chamber 40 can be provided with a detachable covering or a door.

After use, for example when a tire has been sealed and inflated, the box must be prepared for renewed use.

For this purpose, the first conduit 10, the needle 23, the adapter 13 and the container 6 are replaced as mentioned under the description of FIG. 6. The lid 46 designed on the box axially opposite the knob 44 is removed to thereby make room for squeezing the locking tabs 24 of the needle 22 in direction towards each other so that the needle can be detached.

By means of the knob 44, the cover 22 is brought back to its first operative position whereby the cylinder 18 is detached and the first conduit 10, the needle 23, the adapter 13 and the container 6 jointly can be pulled out and discarded.

In the lid 46, a groove or slot can possibly be designed so that the lid easily can be freed by means of e.g. a coin. Removal of the lid 46 can therefore be done without use of special tools.

Figure 11:
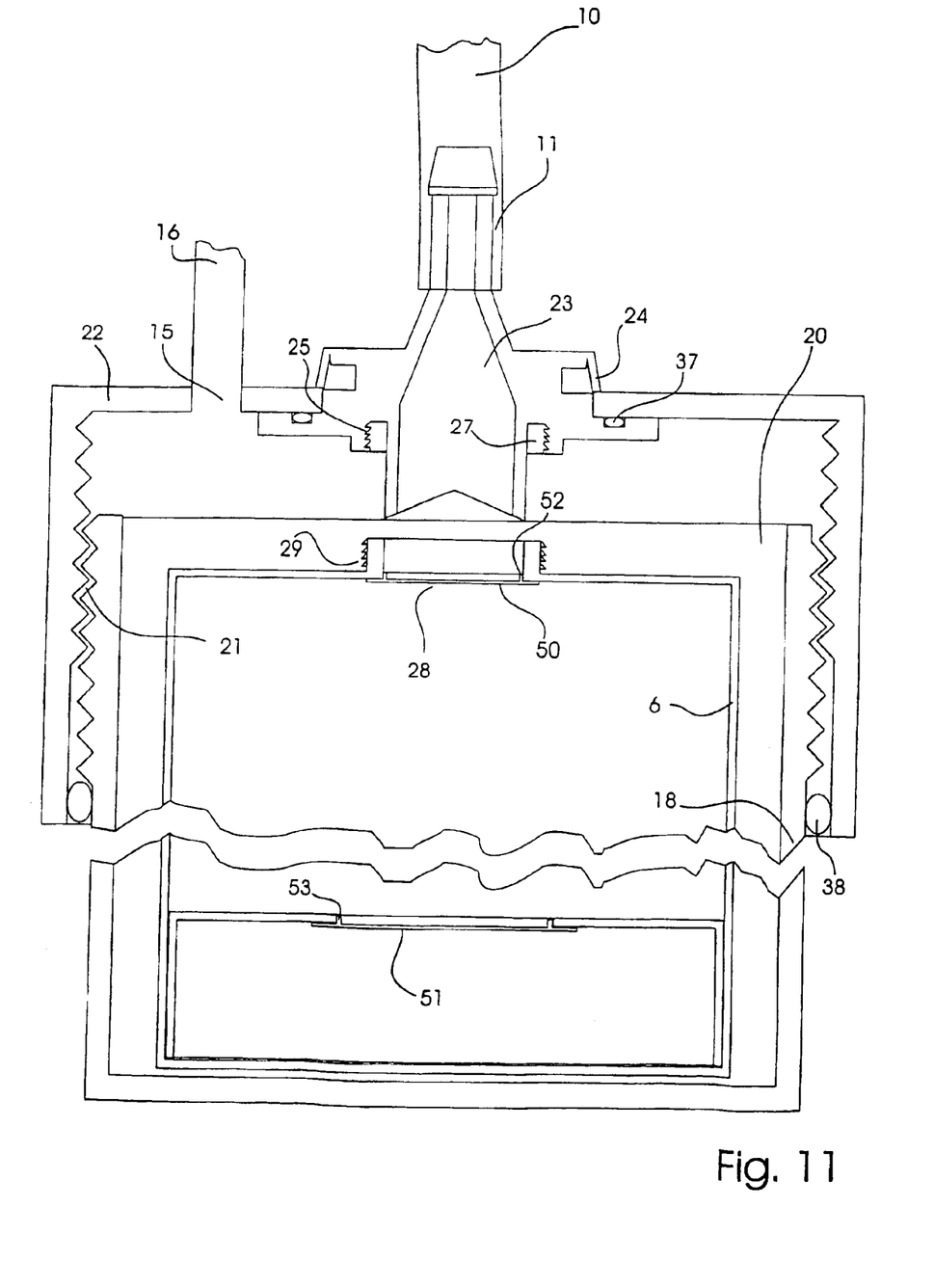
FIG. 11 is on a larger scale a fractional view of the device in FIGS. 1–9 with a second embodiment of a seal in sealed state.

FIG. 11 is a fractional view of the device according to the invention with a first embodiment of a seal in form of a membrane 48 for closing the outlet opening 9 of the container 6 in the case shown. The membrane 48 is cast of e.g. plastic in one piece with the edge 49 of the aperture 9. Thereby, an advantageous, inexpensive structure is obtained, the membrane then being formed simultaneously with the casting of the container.

If a punctured tire is to be mended and subsequently inflated to a wanted pressure, the membrane is broken by the needle 23 in the way described above (not shown).

It is to be noted that also the aperture 33 of the plunger 30 can be provided with a similar membrane (not shown).

Figure 12:
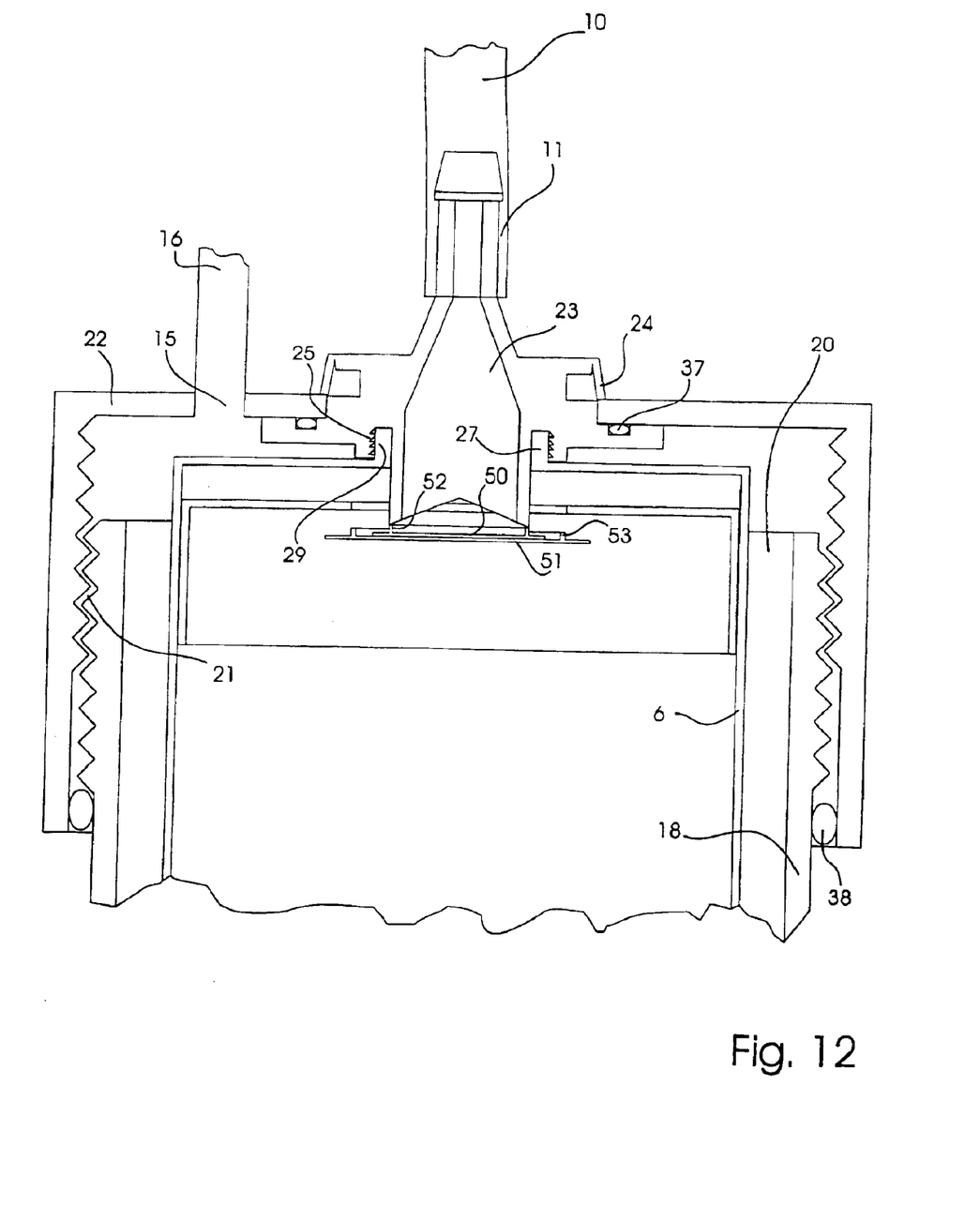
FIG. 12 shows the seal of FIG. 11 in opened state.

FIGS. 11 and 12 are fractional views of the device according to the invention with a second embodiment of a seal in form of slabs 50 and 51.

In FIG. 11, the slabs are detachably mounted in the outlet openings, 9 and 33 respectively, of the container 6 and the plunger 34 by means of collars, 52 and 53 respectively, pressed into the associate outlet openings with a suitable force fit.

In FIG. 12, the slabs have been pushed out of their respective openings by means of the needle 23, which has a blunt end for this purpose.

If slabs are used as seals, the outlet openings, 9 and 33 respectively, of the container and the plunger can be opened without risk of parts of a membrane being driven into and completely or partly closing the needle and/or the subsequent connections to the cover. The force fit can advantageously be adapted in such a way that the slabs are held tightly sealed in their openings but relatively easily and for certain can be pushed out of these openings.

The device according to the invention is quick and easy to operate. Sealing and inflating of a punctured tire can be done in less than three minutes and often as fast as only one minute. When the device is packed up in the box, it practically takes up no space in e.g. a car. To this should be added that the device makes the heavy and bulky spare wheel, which the driver conventionally is driving around with, unnecessary. By instead using the device according to the invention, the space and load capacity previously occupied by the spare wheel is now utilized.

The device according to the invention is described above and shown in the drawing on the assumption that it was to be used foe inflating a car tire having gone flat or for sealing and inflating a car tire having punctured.

Naturally, this is only to be taken as an example as the device just as well can be used for performing the same operations on other tires or other inflatable objects within the scope of the invention.

What is claimed is:

1. A device for inflating a tire having gone flat to a desired pressure or for sealing and inflating a punctured tire, which device comprises a compressed-air source; a tubular container that contains a sealing agent and has an inlet opening for passage of compressed air from the compressed-air source and an outlet opening for passage of sealing agent and compressed air; a first conduit connected to a first area on the device at a first end and having an adapter for detachably connecting the first conduit to a valve on the tire at the second end; and a second conduit connected to a second area on the device at the first end and to the compressed-air source at the second end, wherein the container is enclosed by a tubular cylinder connected to the first end of the second conduit and having a fixed bottom in one end and an aperture in the other end, with the aperture being closed by a cover connected to the first end of the first conduit and mounted on the cylinder displaceable between a first operative position in which the first conduit is communicating with the interior of the cylinder and a second operative position in which the first conduit is communicating with the outlet opening of the container.

2. The device according to claim 1, wherein the outlet opening of the container is sealed by a first seal; and the device further comprises a plunger located in the container behind the sealing agent, with the plunger being displaceable from a bottom position at the inlet opening to a top position at the outlet opening; an aperture in the plunger that is sealed by a second seal; and a cover provided with a needle connected to the first end of the first conduit and located at a distance from the first seal in the first operative position of the cover, with the needle penetrating the seal if the cover is displaced from its first to its second operative position, and the needle penetrating the second seal if the plunger upon activation of the compressed-air source is pushed from its bottom to its top position by the generated compressed air.

3. The device according to claim 2, wherein the needle is detachably mounted in an aperture made in the cover with the aperture having a sufficiently large size to allow the first conduit and its adapter to pass through, and the device further comprises a gasket located-between the needle and the aperture in the cover.

4. The device according to claim 2, wherein either the first or second seals or both comprise breakable membranes made in one piece with the edge of the respective opening.

5. The device according to claim 2, wherein either the first or second seals or both are made as slabs that are detachably mounted in the respective opening.

6. The device according to claim 1, wherein the cylinder and the cover are connected by a threaded joint.

7. The device according to claim 1, wherein the outlet opening of the container is located in a branch piece on a bottom of the container.

8. The device according to claim 7, wherein the branch piece and the needle respectively are made with corresponding barbs engaging each other when the device is in its second operative position.

9. The device according to claim 1, wherein the first end of the second conduit is connected to the cover and the device includes a gap located between the container and the cylinder, which gap allows the second conduit to communicate with the inlet opening of the container.

10. The device according to claim 1, wherein the cylinder and the container are made of a transparent material whereas the plunger or sealing agent have a distinct, dark color that is visible through the transparent cylinder or container.

11. The device according to claim 1, wherein the cylinder and the container are located in a box having at least one window that allows visual viewing of the cylinder and manual displacement of the cylinder.

12. The device according to claim 1, wherein the container includes a conduit, the inlet opening of which is formed by an open end on the conduit and is located at a distance from the bottom of the cylinder.

13. A method of inflating a flat tire, which comprises filling the tire with compressed air from the device of claim 1 to inflate the tire to a desired pressure.

14. A method of inflating a punctured tire, which comprises filling the tire with compressed air and sealing agent from the device of claim 1 so that the sealing agent seals the puncture and the compressed air inflates the tire to a desired pressure.

* * * * *